Aug. 17, 1926.　　　　　　　　　　　　　　　　　　1,596,350
C. GUICHETEAU
GATE AND OPENING MEANS THEREFOR
Filed June 30, 1924　　　2 Sheets-Sheet 2
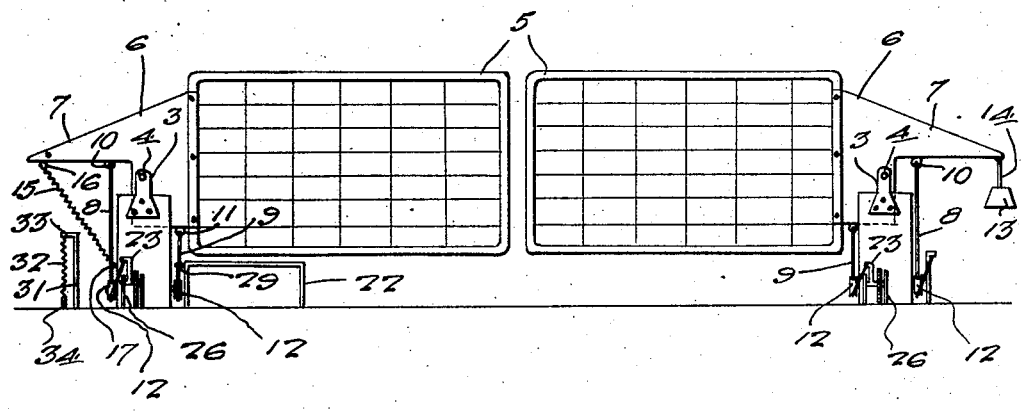
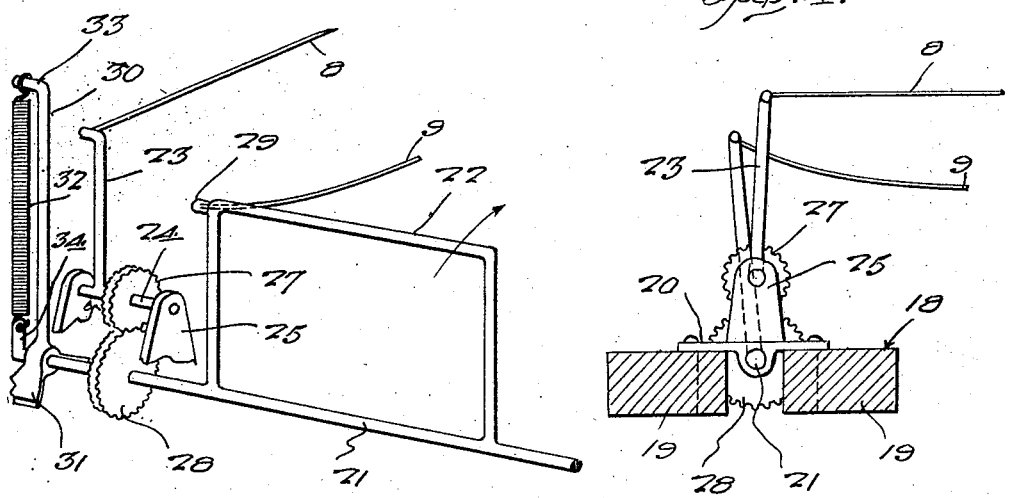
Inventor
C. Guicheteau Patented Aug. 17, 1926.

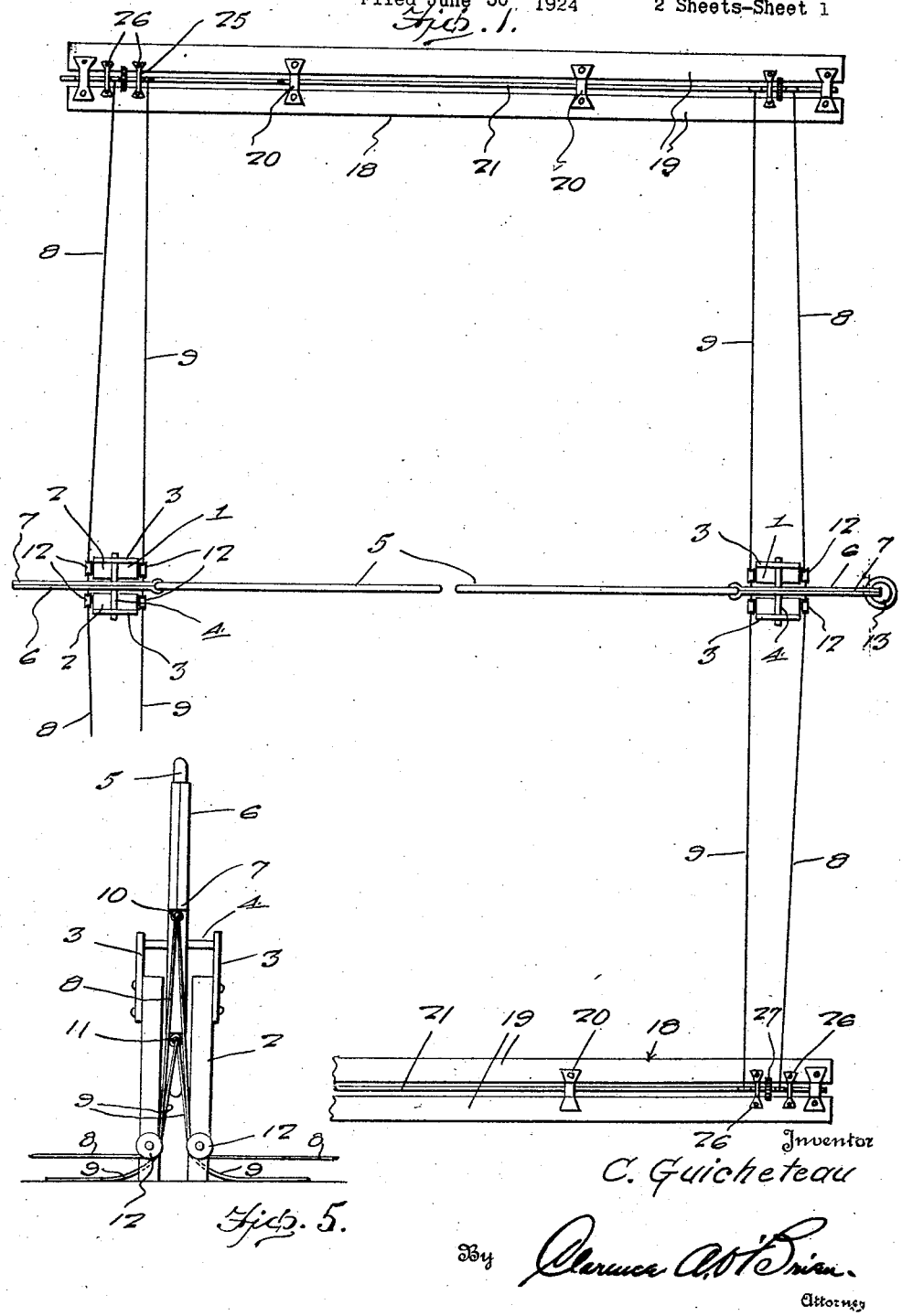

1,596,350

UNITED STATES PATENT OFFICE.

CONSTANT GUICHETEAU, OF LINTLAW, SASKATCHEWAN, CANADA.

GATE AND OPENING MEANS THEREFOR.

Application filed June 30, 1924. Serial No. 723,265.

This invention relates to gates and means associated therewith for opening and closing said gates, actuated by a vehicle passing therethrough.

An object of the invention is to provide a gateway, having posts at the opposite sides thereof with pivotally mounted gates adapted for swinging movement on the pivot to open or close the passage through the gateway, with suitable means operated by a vehicle for primarily opening the gate, and subsequently closing the same after passage of vehicles through the gateway.

Another object of the invention resides in providing a gateway having posts at opposite sides thereof, with gates mounted for swinging movement to open and close the passage through said gateway and pivoted members mounted at opposite sides of the gateway, in the line of approach thereto, having connections with the gate, for operating the gate when either pivoted member is swung by a vehicle.

Another object of the invention resides in providing a means for operating vertically swinging gates for controlling a passageway by pivoted members positioned at opposite sides of the gateway, in spaced relation thereto, and having means for normally retaining said operating members in a fixed position on their pivots, connections being provided between the operating members and the gate, so that a swinging movement in one direction of the operating members from said normal position will effect an opening of the gate and a movement in the opposite direction from said normal position will effect a closing of the gate.

The invention also includes other objects and improvements in the details of construction and arrangement of the parts which are more particularly pointed out in the following description and claims, directed to a preferred form of the invention, it being understood, however, that variations may be made from this construction, without departing from the spirit and scope of this invention as described and claimed.

In the drawings, forming a part of this application:

Figure 1 is a plan view of the invention, showing the gates in closed position and the operating means therefor in normal position, ready for operation.

Figure 2 is an elevational view of the gate and the operating means therefor.

Figure 3 is an enlarged perspective view of a portion of the operating member for the gate, and adjacent connections.

Figure 4 is an end elevation of one of said operating members.

Figure 5 is a side elevation of the posts and gate carried thereby with the operating connection adjacent thereto.

A pair of posts indicated at 1, are positioned at opposite sides of the gateway and include post members 2, arranged in spaced relation with each other, having at the upper ends brackets 3, which receive the ends of shafts 4, for rotation therein, and which carry the gates 5 for vertical swinging movement. The gates cooperate in horizontal position to close the passageway between the posts 1, in a manner clearly illustrated in Figure 2, and each gate includes as a part of the integral structure thereof a plate member 6, which receives the shaft 4, and has projection 7 extending to the opposite side of said shaft from the gate 5 for a purpose which will presently appear. A pair of cables for operating each gate are arranged at opposite sides of each post as at 8 and 9, and form opening and closing cables respectively. The central portions of these cables 8 and 9 are secured to the plate 6, the cable 8 to the extension 7 thereon, as indicated at 10, the cable 9 adjacent the gate 5, as indicated at 11. The ends of these cables for each gate extend downwardly on opposite sides of each post and are trained over pulleys 12 mounted at the lower ends of the posts adjacent the ground surface as indicated in Figures 2 and 5. There is a pulley 12 for each end of the cables 8 and 9 as clearly indicated in Figure 5, so that the ends of the cables are directed in opposite directions from the post 2. The end of one extension 7 on one of the plates 6 is provided with a counter balancing weight 13 secured to the end of the extension 7, by a suitable connection 14. A spring 15 is connected to the extension 7, on the other plate 6, adjacent the outer end of said extension as indicated at 16, while the other end of said spring is attached to the post 2, as indicated at 17. Said spring is tensioned so that it equalizes the weight of the gate 5, to which it is attached, for counter balancing said gate, and holding the same in raised position, when moved to said position by the operating means.

Gate operating means generally indicated by the numeral 18 are positioned across the approaches to the gateway in spaced relation thereto, and at opposite sides thereof, the operating means at each side of the gateway being identical, and a description of one being sufficient for both.

The gate operating means includes a pair of spaced bar members 19, which are seated in the roadway approaching the gate, and are connected and held in spaced relation, in the central portion by members 20, which also form bearings for the operating shaft 21. Adjacent one end of the operating shaft 21, the same is formed with an open frame 22, which is positioned at one side of the roadway approaching the gateway, and is adapted to be engaged by the wheels of a vehicle approaching the gateway and rocked from the vertical position shown in Figures 2 and 3, particularly, to a horizontal position on the roadway, as the wheels of the vehicle pass thereover. Advantage is taken of this movement of the frame 22 for opening the gate by exerting a pull on the cables 8, for opening each gate, the ends of which are connected to operating levers 23, carried by rock shafts 24, mounted in the upstanding ears 25 carried by bearing brackets mounted on the bars 19, as indicated at 26. The rock shafts 24 are provided with pinion gears 27, meshing with the spur gears 28, on the operating shaft 21, so that it will be seen, particularly from Figure 3, that when the frame 22 is rocked toward the gateway, by an approaching vehicle, as indicated by the arrow, in Figure 3, the operating levers 23 will be rocked to exert a pull on the cables 8, which, through connections 10 with the plates 6 of the gates will cause a swinging movement of the gates on the shafts 4, so that they will be raised to a vertical position, substantially at right angles to that shown in Figure 2. The vehicle is now free to pass through the gateway, after which the wheels thereof will engage the frame 22, on the operating shaft at the opposite side of the gate, and rock the same in a direction opposite to that indicated by the arrow in Figure 3, and through the connections with the cables 9, as indicated at 29, in Figure 3, with the upper free corners of the frames 22, will effect a pull on said cable and through the connections at 11, with the plates 6, will effect a movement of the gates from the vertical open position to the horizontal closed position shown in Figure 2, and thus close the gateway against the passage of other vehicles or animals, in an obvious manner. A special bearing bracket 30 is mounted with the seat portion 31 on the bars 19, in a position, as shown in Figure 3, with a spring 32 connecting the laterally projecting arm on the upper end of the bracket, as indicated at 33, with a laterally extending arm 34 on the operating shaft 21, so that the shaft will be normally held in the position shown in Figure 3, with the frame 22 in a vertical plane, positioning it for engagement by the wheels of the vehicle, for operation in one direction, to operate the opening cable 8, or in the other direction for operating the gate closing cables 9. When the gate is closed, the cables 9 have sufficient slack so that when the gate is opened, the cables 9 will just become taut when the gate reaches full open position.

In this construction, it will be readily seen that a simple and convenient form of gate structure has been provided for gateways in fences and the like, including a pair of vertically swinging gates mounted on posts at opposite sides of the gateway, having a simple rockable operating means connected with the gates by pairs of cables and adapted for operation by the wheels of a vehicle approaching and leaving the gateway, to open and close the same.

What is claimed is:

A gate structure of the class described including a swingable gate and operating means for opening and closing said gate including an operating shaft having a frame member formed adjacent one end thereof, said shaft being positioned at one side of the gate in spaced relation thereto, resilient means connected with said shaft normally operable to hold the frame in vertical position, a second shaft mounted above the first shaft, gears connecting the two shafts so that they rotate in opposite directions, an operating lever mounted upon the second shaft for rocking movement above the operating shaft, a connection between said operating lever and said gate, and a connection between said frame and said gate so that when the frame is rocked in one direction the gate is opened and when the frame is rocked in the opposite direction the gate is closed.

In testimony whereof I affix my signature.

CONSTANT GUICHETEAU.